(12) United States Patent
Vögtle et al.

(10) Patent No.: US 12,018,730 B2
(45) Date of Patent: Jun. 25, 2024

(54) TORQUE TRANSMITTING DEVICE

(71) Applicant: Schaeffler Technologies AG & Co. KG, Herzogenaurach (DE)

(72) Inventors: Benjamin Vögtle, Weingarten (DE); Stephan Maienschein, Baden-Baden (DE); Peter Wahl, Wörth-Maximiliansau (DE); Daniel Echle, Kehl (DE); David Schnädelbach, Ottersweier (DE); Thorsten Krause, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/767,679

(22) PCT Filed: Aug. 20, 2020

(86) PCT No.: PCT/DE2020/100730
§ 371 (c)(1),
(2) Date: Apr. 8, 2022

(87) PCT Pub. No.: WO2021/069010
PCT Pub. Date: Apr. 15, 2021

(65) Prior Publication Data
US 2024/0117859 A1   Apr. 11, 2024

(30) Foreign Application Priority Data

Oct. 10, 2019  (DE) .................... 10 2019 127 215.7
Nov. 6, 2019   (DE) .................... 10 2019 129 842.3

(51) Int. Cl.
*F16F 15/14* (2006.01)
*B60K 6/30* (2007.10)
(Continued)

(52) U.S. Cl.
CPC ............. *F16F 15/145* (2013.01); *F16D 3/12* (2013.01); *F16D 2300/22* (2013.01); *F16F 2232/02* (2013.01)

(58) Field of Classification Search
CPC ....... F16F 15/145; F16F 2232/02; F16D 3/12; F16D 2300/22
See application file for complete search history.

(56) References Cited

U.S. PATENT DOCUMENTS 6,435,998 B1 * 8/2002 Sudau ................. F16H 45/02
475/47
6,561,336 B1 * 5/2003 Huart ................. F02B 63/04
192/85.49
(Continued)

FOREIGN PATENT DOCUMENTS

BR     9503028 A    6/1996
CN   102792056 A   11/2012
(Continued)

OTHER PUBLICATIONS

Translation of WO-2009067988-A1, Krause et al., Apr. 6, 2009 (Year: 2009).*
(Continued)

*Primary Examiner* — Vinh Luong

(57) ABSTRACT

A torque transmitting device for a drivetrain for transmitting a drive torque to an output element. The device having: an electric motor with a conversion unit, which comprises a stator and a rotor that is rotatable relative to the stator, for converting electrical energy into mechanical energy; and a torsional vibration damper with a damper mass received on a damper mass support such that the damper mass can be deflected to a limited extent against the action of a restoring force, the damper mass being arranged so as to overlap radially with the conversion unit.

20 Claims, 2 Drawing Sheets

(51) Int. Cl.
  B60K 6/38 (2007.10)
  B60K 6/40 (2007.10)
  F16D 3/12 (2006.01)

(56) References Cited

U.S. PATENT DOCUMENTS

| | | | | |
|---|---|---|---|---|
| 8,573,374 | B2* | 11/2013 | Magerkurth | F16H 45/02 |
| | | | | 192/55.61 |
| 10,006,517 | B2* | 6/2018 | Li | F16F 15/1232 |
| 10,995,818 | B2* | 5/2021 | Weber | B60K 6/40 |
| 11,242,920 | B2* | 2/2022 | Li | F16H 45/02 |
| 2022/0388388 | A1* | 12/2022 | Maienschein | B60K 6/30 |

FOREIGN PATENT DOCUMENTS

| | | |
|---|---|---|
| CN | 107923483 A | 4/2018 |
| DE | 102012203611 A1 | 10/2012 |
| DE | 102012219028 A1 | 5/2013 |
| DE | 102013213422 A1 | 2/2014 |
| DE | 102014222644 A1 | 5/2016 |
| DE | 102016211943 A1 | 1/2018 |
| DE | 102016211945 A1 | 1/2018 |
| DE | 112009002182 B4 | 6/2019 |
| EP | 2600031 A2 | 6/2013 |
| WO | WO-2009067988 A1 * 6/2009 ............ F16F 15/145 |
| WO | 2018041294 A1 | 3/2018 |
| WO | 2020201331 A1 | 10/2020 |

OTHER PUBLICATIONS

Translation of Written Opinion of the International Searching Authority of PCT/DE2020/100730, Dec. 8, 2020. (Year: 2020).*

* cited by examiner

TORQUE TRANSMITTING DEVICE

CROSS-REFERENCE TO RELATED APPLICATIONS

This application is the U.S. National Phase of PCT Appln. No. PCT/DE2020/100730 filed Aug. 20, 2020, which claims priority to DE 10 2019 127 215.7 filed Oct. 10, 2019 and DE 10 2019 129 842.3 filed Nov. 6, 2019, the entire disclosures of which are incorporated by reference herein.

TECHNICAL FIELD

The disclosure relates to a torque transmission device.

BACKGROUND

A torque transmission device is known from DE 10 2014 222 644 A1, for example. A torque transmission device for a drivetrain of a motor vehicle is described therein. The torque transmission device comprises an input side for connection to an internal combustion engine as a drive element, an output side for connection to an output element, an electric motor with a stator and a rotor and a torsional vibration damper between the rotor and the output side. The torsional vibration damper comprises a centrifugal pendulum which is arranged radially inside of the rotor.

SUMMARY

The object of the present disclosure is to improve a torque transmission device. It is intended to reduce torsional vibrations to a greater extent and to also save axial installation space.

At least one of these objects is achieved by a torque transmission device with the features described herein. As a result, the torsional vibration damper can be operated more efficiently and, at the same time, axial installation space can be saved.

The drivetrain can be arranged in a vehicle. The drivetrain can be a hybrid drivetrain. The conversion unit can provide the drive torque. The drive torque can be provided by a drive element, in particular an internal combustion engine. A separating clutch can be effectively arranged between the drive element and the electric motor. The separating clutch can be designed as a K0 clutch. The electric motor can be operable in a P2 hybrid configuration.

The output element can be a transmission, preferably an automatic transmission, a manual transmission, a CVT transmission or a dual clutch transmission.

The rotor can be arranged radially inside or radially outside of the stator. The rotor is arranged mainly so as to overlap axially with the stator. The rotor is connected to a rotor carrier for transmitting the drive torque provided by the conversion unit.

The torsional vibration damper can be effectively arranged between the separating clutch and the output element. The torsional vibration damper can be a fixed frequency damper or a speed-adaptive damper. The torsional vibration damper can be effectively arranged between the electric motor and the output element. A further torsional vibration damper can be effectively arranged between the separating clutch and the output element. The torsional vibration damper can be arranged in a fluid chamber that can be at least partially filled with a fluid.

A torque transmission unit can be arranged effectively between the separating clutch and the output element. The torque transmission unit can have a housing which delimits a fluid chamber. The torsional vibration damper can be arranged inside the housing.

In a preferred embodiment of the disclosure, the damper mass is arranged axially at a distance from the conversion unit. The torsional vibration damper can be arranged axially between the electric motor and the output element or on the opposite side.

In a specific embodiment of the disclosure, a radial inner circumference of the damper mass is arranged radially inside or radially outside of a radially inner circumference of the conversion unit. A radial inner circumference of the damper mass can be arranged radially inside or radially outside of a radial inner circumference of the rotor and/or the stator.

In a further specific embodiment of the disclosure, a radial outer circumference of the damper mass is arranged radially inside or radially outside of a radial outer circumference of the conversion unit. A radial outer circumference of the damper mass can be arranged radially inside or radially outside of a radial outer circumference of the rotor and/or the stator.

In a preferred embodiment of the disclosure, a radial outer circumference of the damper mass is arranged radially outside of a radial inner circumference of the conversion unit. A radial outer circumference of the damper mass can be arranged radially outside of a radial inner circumference of the rotor and/or the stator.

In a specific embodiment of the disclosure, a center of gravity of the damper mass is arranged radially outside of a radial inner circumference of the conversion unit. A center of gravity of the damper mass can be arranged radially outside of a radial inner circumference of the rotor and/or stator.

In a specific embodiment of the disclosure, a center of gravity of the damper mass is arranged radially inside of a radial outer circumference of the conversion unit. A center of gravity of the damper mass can be arranged radially inside of a radial outer circumference of the rotor and/or stator.

In a further specific embodiment of the disclosure, the torsional vibration damper is a centrifugal pendulum and the damper mass is a pendulum mass which is attached to the damper mass support designed as a pendulum mass support and can be deflected to a limited extent along a pendulum path.

The internal combustion engine can generate torsional vibrations. The torsional vibrations can have at least one main order of excitation, wherein the centrifugal pendulum is designed according this order of excitation to reduce the torsional vibrations as much as possible. A further centrifugal pendulum can be arranged, in particular effectively, between the separating clutch and the output element. The further centrifugal pendulum can be designed according to the same or a different order of excitation as the first centrifugal pendulum. The further centrifugal pendulum can have at least one pendulum mass which is arranged such that it overlaps radially towards or radially inside of the conversion unit.

The centrifugal pendulum can have at least two circumferential pendulum masses. The pendulum masses can be coupled to one another by coupling means. The coupling means can have a force coupling for force transmission between the pendulum masses and/or a motion coupling for synchronizing the motions of the pendulum masses.

The pendulum mass can be arranged axially overlapping with the pendulum mass support. The pendulum mass can be arranged in a pendulum mass recess in the pendulum mass support. The pendulum mass can be arranged axially mainly within the pendulum mass support. The pendulum mass can be formed from a first pendulum mass part and a second pendulum mass part connected thereto. The first pendulum mass part can be arranged on a first axial side of the pendulum mass support and the second pendulum mass part can be arranged on an opposite, second axial side of the pendulum mass support.

The pendulum mass can be supported on the pendulum mass support via at least one bearing element. The bearing element can be rollable on a radial outer circumference of the pendulum mass. The bearing element can be rollable on a radially outer inner circumference of the pendulum mass recess.

In a specific embodiment of the disclosure, the torsional vibration damper is arranged within a torque converter effectively arranged between the electric motor and the output element. The torsional vibration damper can be operated at least partially in a fluid while in wet-running operation.

In a preferred embodiment of the disclosure, a converter lock-up clutch and/or a torsional vibration damper is arranged within the torque converter and radially inside the conversion unit. As a result, the installation space within the conversion unit can be used.

Further advantages and advantageous embodiments of the disclosure result from the description of the figures and the drawings.

BRIEF DESCRIPTION OF THE DRAWINGS

The disclosure is described in detail below with reference to the drawings. Specifically.

DETAILED DESCRIPTION

Figure 1:
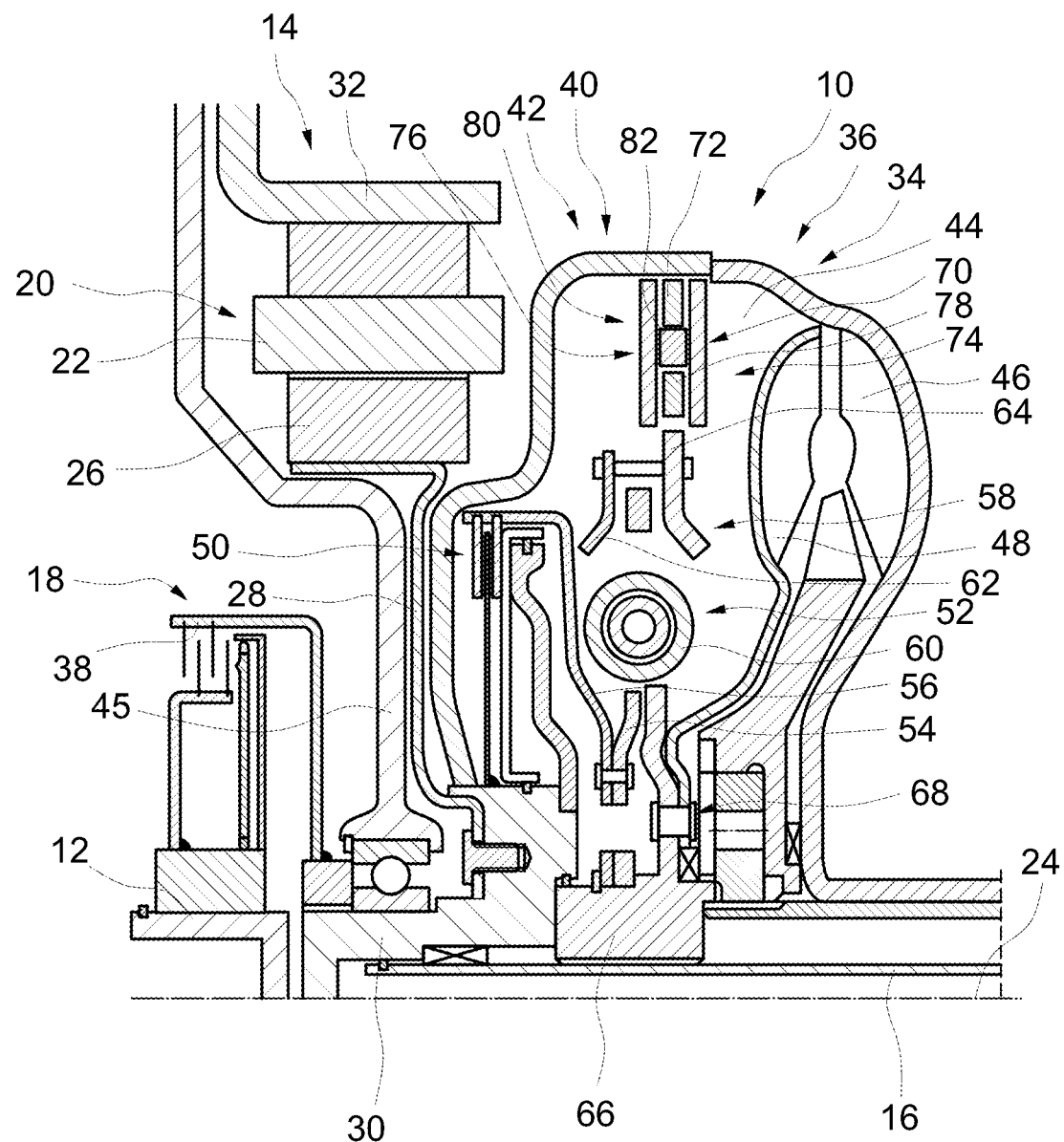
FIG. 1: shows a half-section through a torque transmission device in a specific embodiment of the disclosure.

FIG. 1 shows a half-section through a torque transmission device 10 in a specific embodiment of the disclosure. The torque transmission device 10 is installed in a drivetrain of a vehicle. The drivetrain is a hybrid drivetrain in which a drive element provides drive torque via a drive shaft 12. The drive element is designed, for example, as an internal combustion engine. Furthermore, an electric motor 14 provides a further drive torque for transmission to an output element which has a transmission input shaft 16 on the input side. The output element is preferably a transmission.

A separating clutch 18 is effectively arranged between the drive element and the electric motor 14. The separating clutch 18 is a K0 clutch and the electric motor 14 is connected in a P2 hybrid configuration. The electric motor 14 comprises a conversion unit 20 which is set up to convert electrical energy into mechanical energy, a stator 22 and a rotor 26 which is rotatable relative to the stator 22 about an axis of rotation 24. The rotor 26 is screwed to an input shaft 30 via a rotor carrier 28. The stator 22 is received on a stator carrier 32 which is connected to a fixed housing.

The separating clutch 18 is connected downstream of a torque transmission unit 34, which is designed here as a torque converter 36. A clutch output 38 of the separating clutch 18 is connected to the input shaft 30 in a rotationally fixed manner. The input shaft 30 is fixed to a housing 40 of the torque transmission unit 34 in a fixed manner. The housing 40 is designed as a converter housing 42 and delimits a fluid chamber 44 for receiving a converter fluid.

The torque transmission unit 34 is mounted on a separating wall 45 via the input shaft 30. The separating wall 45 is arranged on a fixed housing. The separating wall 45 is arranged axially between and radially overlapping with the separating clutch 18 and the torque transmission unit 34.

A pump wheel 46 is connected in a fixed manner to the converter housing 42 and transmits torque to a turbine wheel 48, which is connected to the transmission input shaft 16. A converter lock-up clutch 50 is connected in parallel with the pump wheel 46 and the turbine wheel 48. When the converter lock-up clutch 50 is open, torque is transmitted via the pump wheel 46 and the turbine wheel 48 to the output element. When the converter lock-up clutch 50 is closed, the drive torque is guided via the converter lock-up clutch 50 to a torsional vibration damper 52 connected downstream and from there to the output element.

The torsional vibration damper 52 and the converter lock-up clutch 50 are arranged radially inside of the conversion unit 20. The converter lock-up clutch 50 partially axially overlaps with the conversion unit 20 and the torsional vibration damper 52 is arranged axially offset in relation to the conversion unit 20.

A damper input part 54 of the torsional vibration damper 52 is connected in a fixed manner to a clutch output 56 of the converter lock-up clutch 50. A damper output part 58 can be rotated to a limited extent in relation to the damper input part 54 via the action of spring elements 60, which are designed as helical springs, in particular as compression springs. The damper output part 58 is designed in two parts here and comprises a first damper disc part 62 and a second damper disc part 64 which is connected in a fixed manner and is arranged axially at a distance thereto, which in turn is connected in a fixed manner to an output hub 66 and the turbine wheel 48 via a rivet connection 68.

A torsional vibration damper 70 is arranged on the damper output part 58, here on the second damper disc part 64. The torsional vibration damper 70 comprises a damper mass support 72 and at least one damper mass 74 received thereon such that it can be deflected against the action of a restoring force. The torsional vibration damper 70 is designed here as a centrifugal pendulum 76 and the damper mass support 72 forms a pendulum mass support 78 and the damper mass 74 forms a pendulum mass 80. The pendulum mass 80 can be deflected to a limited extent in relation to the pendulum mass support 78 against the effect of the centrifugal force along a pendulum path. The pendulum mass 80 is supported on the pendulum mass support 78 via at least one bearing element 82.

The pendulum mass support 78 can be designed in one piece with the damper output part 58, in particular with the second damper disc part 64, or as a separate component. At least two pendulum masses 80 arranged circumferentially at a distance can be arranged on the pendulum mass support 78. The pendulum masses 80 are arranged radially outside of the converter lock-up clutch 50 and the spring elements 60 and so as to overlap radially with the conversion unit 20. The pendulum mass 80 is attached in an axially offset manner to the conversion unit 20. A radial inner circumference of the pendulum mass 80 is radially further outward than a radial inner circumference of the rotor 26, and a radial outer circumference of the pendulum mass 80 is arranged radially outside of a radial outer circumference of the stator 22. As a result, the mass moment of inertia of the pendulum mass 80 can be increased and the axial installation space required for the centrifugal pendulum 76 can be reduced.

Figure 2:
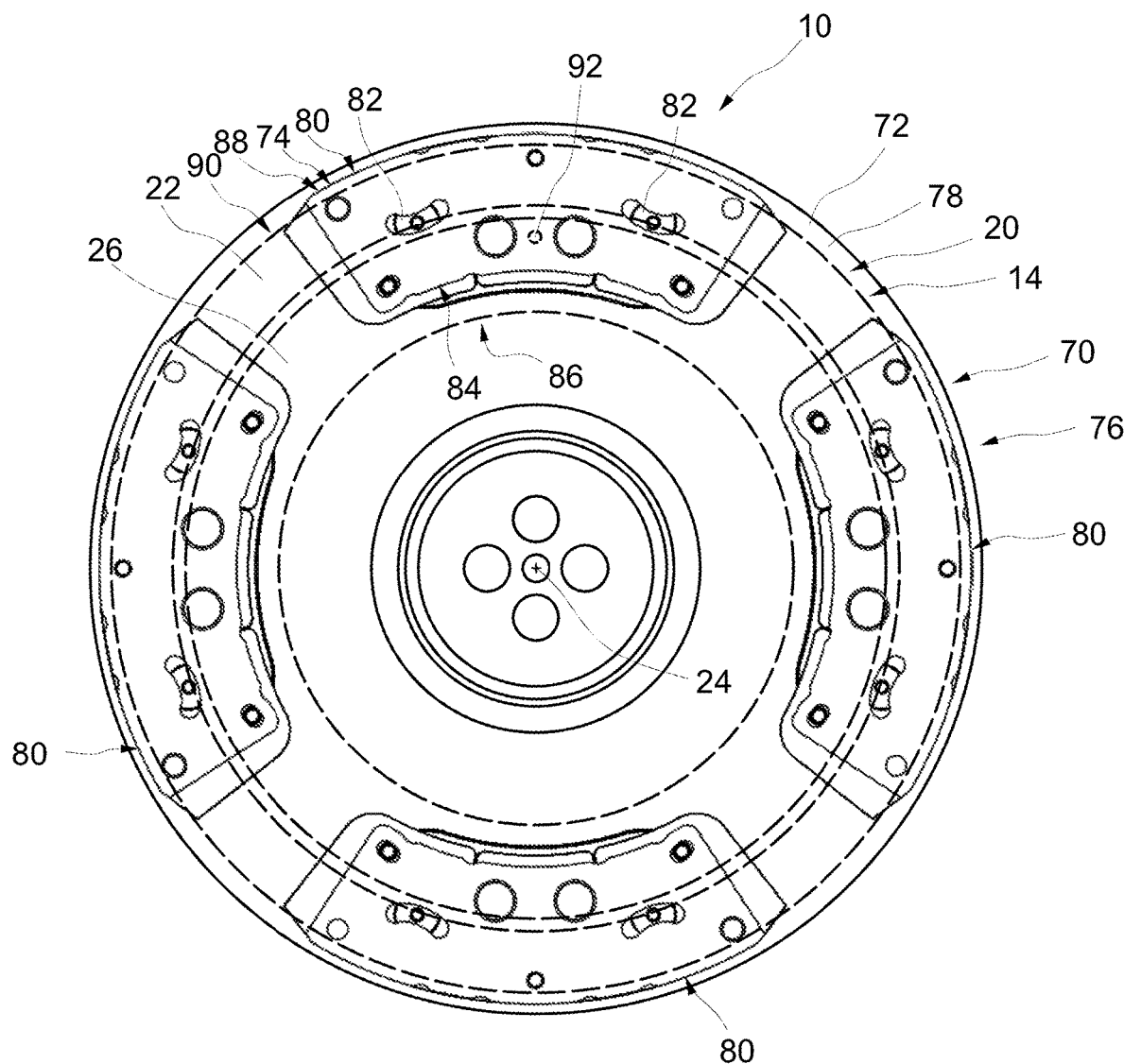
FIG. 2: shows a side view of a torque transmission device in a further specific embodiment of the disclosure.

FIG. 2 shows a side view of a torque transmission device 10 in a further specific embodiment of the disclosure. The conversion unit 20 of the electric motor 14 is shown in dashed lines. The conversion unit 20 thus comprises the rotor 26 rotatable about the axis of rotation 24 and the fixed stator 22.

The torsional vibration damper 70 is designed as a centrifugal pendulum 76. The damper mass 74 is designed as a pendulum mass 80 and the damper mass support 72 is designed as a pendulum mass support 78 rotatable about the axis of rotation 24. A total of four pendulum masses 80 are arranged circumferentially. The individual pendulum mass 80 is supported on the pendulum mass support 78 via two bearing elements 82, which are designed here as pendulum rollers.

A radial inner circumference 84 of the pendulum mass 80 is arranged radially outside of a radial inner circumference 86 of the conversion unit 20, here in particular outside of a radially inner circumference of the rotor 26. A radial outer circumference 88 of the pendulum mass 80 is arranged radially outside of a radial outer circumference 90 of the conversion unit 20, here in particular outside of a radially outer circumference of the stator 22. The radial outer circumference 88 of the pendulum mass 80 is arranged radially outside of the radial inner circumference 86 of the conversion unit 20, here outside of a radial inner circumference of the rotor 26 and also outside of a radial inner circumference of the stator 22. A center of gravity 92 of the pendulum mass 80 is arranged radially outside of the radial inner circumference 86 of the conversion unit 20 and radially inside of the radial outer circumference 90 of the conversion unit 20.

LIST OF REFERENCE SYMBOLS

- 10 Torque transmission device
- 12 Drive shaft
- 14 Electric motor
- 16 Transmission input shaft
- 18 Separating clutch
- 20 Conversion unit
- 22 Stator
- 24 Axis of rotation
- 26 Rotor
- 28 Rotor carrier
- 30 Input shaft
- 32 Stator carrier
- 34 Torque transmission unit
- 36 Torque converter
- 38 Clutch output
- 40 Housing
- 42 Converter housing
- 44 Fluid chamber
- 45 Separating wall
- 46 Pump wheel
- 48 Turbine wheel
- 50 Converter lock-up clutch
- 52 Torsional vibration damper
- 54 Damper input part
- 56 Clutch output
- 58 Damper output part
- 60 Spring element
- 62 Damper disc part
- 64 Damper disc part
- 66 Output hub
- 68 Rivet connection
- 70 Torsional vibration damper
- 72 Damper mass support
- 74 Damper mass
- 76 Centrifugal pendulum
- 78 Pendulum mass support
- 80 Pendulum mass
- 82 Bearing element
- 84 Inner circumference
- 86 Inner circumference
- 88 Outer circumference
- 90 Outer circumference
- 92 Center of gravity

The invention claimed is:

1. A torque transmission device for a drivetrain for transmitting a drive torque to an output element, the torque transmission device comprising:
   an electric motor with a conversion unit, which comprises a stator and a rotor that is rotatable relative to the stator, for converting electrical energy into mechanical energy, and
   a torsional vibration damper with a damper mass received on a damper mass support such that the damper mass can be deflected to a limited extent against an action of a restoring force,
   wherein the damper mass is arranged so as to overlap radially with the conversion unit;
   wherein a center of gravity of the damper mass is arranged radially outside of a radial inner circumference of the conversion unit.

2. The torque transmission device according to claim 1, wherein the damper mass is arranged axially at a distance from the conversion unit.

3. The torque transmission device according to claim 1, wherein a radial inner circumference of the damper mass is arranged radially inside or radially outside of a radial inner circumference of the conversion unit.

4. The torque transmission device according to claim 1, wherein a radial outer circumference of the damper mass is arranged radially inside or radially outside of a radial outer circumference of the conversion unit.

5. The torque transmission device according to claim 1, wherein a radial outer circumference of the damper mass is arranged radially outside of a radial inner circumference of the conversion unit.

6. The torque transmission device according to claim 1, wherein a center of gravity of the damper mass is arranged radially inside of a radial outer circumference of the conversion unit.

7. The torque transmission device according to claim 1, wherein the torsional vibration damper is a centrifugal pendulum and the damper mass is a pendulum mass which is attached to the damper mass support configured as a pendulum mass support and can be deflected to a limited extent along a pendulum path.

8. The torque transmission device according to claim 1, wherein the torsional vibration damper is arranged within a torque converter effectively arranged between the electric motor and the output element.

9. The torque transmission device according to claim 8, wherein a converter lock-up clutch and/or a further torsional vibration damper is arranged within the torque converter and radially inside the conversion unit.

10. A torque transmission device for a drivetrain for transmitting a drive torque to an output element, the torque transmission device comprising:
    an electric motor with a conversion unit, which comprises a stator and a rotor that is rotatable relative to the stator, for converting electrical energy into mechanical energy, and a torsional vibration damper with a damper mass received on a damper mass support such that the damper mass can be deflected to a limited extent against an action of a restoring force, wherein the damper mass is arranged so as to overlap radially with the conversion unit;

wherein a center of gravity of the damper mass is arranged radially inside of a radial outer circumference of the conversion unit.

11. The torque transmission device according to claim 10, wherein the damper mass is arranged axially at a distance from the conversion unit.

12. The torque transmission device according to claim 10, wherein a radial inner circumference of the damper mass is arranged radially inside or radially outside of a radial inner circumference of the conversion unit.

13. The torque transmission device according to claim 10, wherein a radial outer circumference of the damper mass is arranged radially inside or radially outside of a radial outer circumference of the conversion unit.

14. The torque transmission device according to claim 10, wherein a radial outer circumference of the damper mass is arranged radially outside of a radial inner circumference of the conversion unit.

15. The torque transmission device according to claim 10, wherein the torsional vibration damper is a centrifugal pendulum and the damper mass is a pendulum mass which is attached to the damper mass support configured as a pendulum mass support and can be deflected to a limited extent along a pendulum path.

16. The torque transmission device according to claim 10, wherein the torsional vibration damper is arranged within a torque converter effectively arranged between the electric motor and the output element.

17. The torque transmission device according to claim 16, wherein at least one of a converter lock-up clutch and a further torsional vibration damper is arranged within the torque converter and radially inside the conversion unit.

18. A torque transmission device for a drivetrain for transmitting a drive torque to an output element, the torque transmission device comprising:

an input shaft;

a torque converter including a housing rotationally fixed to the input shaft;

an electric motor with a conversion unit, which comprises a stator and a rotor that is rotatable relative to the stator, for converting electrical energy into mechanical energy, a rotor carrier rotationally fixed to the input shaft and supporting the rotor, the rotor carrier and the electric motor each being disposed external to the torque converter; and a torsional vibration damper disposed within the torque converter, the torsional vibration damper including a damper mass received on a damper mass support such that the damper mass can be deflected to a limited extent against an action of a restoring force, wherein the damper mass is arranged so as to overlap radially with the conversion unit.

19. The torque transmission device according to claim 18, further comprising a separating clutch connected to the input shaft, the rotor carrier being effectively arranged axially between the separating clutch and the torque converter.

20. The torque transmission device according to claim 18, wherein a center of gravity of the damper mass is arranged radially between a radial outer circumference of the conversion unit and a radial inner circumference of the conversion unit.

* * * * *